(12) United States Patent
Zimmer et al.

(10) Patent No.: US 6,624,214 B2
(45) Date of Patent: Sep. 23, 2003

(54) RUBBER COMPOSITIONS CONTAINING PRECIPTATED ORGANOSILICON PARTICLES HAVING A CORE AND A SHELL

(75) Inventors: Rene Jean Zimmer, Howald (LU); Wolfgang Lauer, Mersch (LU); Marc Weydert, Luxembourg (LU); Friedrich Visel, Bofferdange (LU); Uwe Ernst Frank, Marpingen (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 430 days.

(21) Appl. No.: 09/794,561

(22) Filed: Feb. 27, 2001

(65) Prior Publication Data

US 2001/0053812 A1 Dec. 20, 2001

Related U.S. Application Data

(60) Provisional application No. 60/188,373, filed on Mar. 10, 2000.

(51) Int. Cl.$^7$ ............ C08L 83/00; C08K 9/02; C08K 5/24
(52) U.S. Cl. ........ 523/203; 524/262; 524/264
(58) Field of Search ............ 523/203; 524/262, 524/264

(56) References Cited

U.S. PATENT DOCUMENTS

| 5,708,093 A | 1/1998 | Bastelberger et al. ....... 525/288 |
| 5,854,369 A | 12/1998 | Geck et al. ................. 528/30 |

FOREIGN PATENT DOCUMENTS

| EP | 0630940 | 6/1994 | .......... C08L/27/12 |

OTHER PUBLICATIONS

"Communications", by F. Baumann, B. Beubzer, M. Geck, J. Dauth, S. Sheiko and M. Schmidt; *Advanced Materials*, 1997, No. 12, pp. 955 through 958.

*Primary Examiner*—Peter D. Mulcahy
(74) *Attorney, Agent, or Firm*—Bruce J. Hendricks; John D. DeLong

(57) ABSTRACT

There is disclosed a rubber composition comprising:

(a) 100 parts by weight of at least one rubber containing olefinic unsaturation; and (b) 1 to 150 phr of a precipitated organosilicon particles having a core and a shell, wherein the core is obtained by the condensation of at least one monomer of the formula:

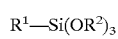

I where $R^1$ is selected from the group consisting of hydrogen, methyl, ethyl, vinyl, alkoxy having from 1 to 4 carbon atoms, and phenyl; $R^2$ is selected from the group consisting of alkyls having from 1 to 4 carbon atoms and phenyl; and wherein said condensation of said monomer is in the presence of a surfactant; and wherein the shell is obtained by the subsequent addition to the core of a monomer of the formula:

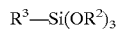

II where $R^3$ is selected from the group consisting of —CH=CH$_2$, —CH$_2$—CH=CH$_2$,

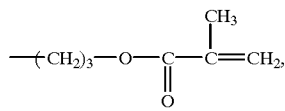

—(CH$_2$)$_n$SH and mixtures thereof; and n is an integer of from 2 to 8.

20 Claims, No Drawings

RUBBER COMPOSITIONS CONTAINING PRECIPTATED ORGANOSILICON PARTICLES HAVING A CORE AND A SHELL

This application claims the benefit of U.S. Provisional Application No. 60/188,373 filed Mar. 10, 2000.

BACKGROUND OF THE INVENTION

Nanomaterials are particles having a size of from 1 to 30 nanometers in diameter. Use of nanomaterials have been known in rubber. For example, in U.S. Pat. 4,644,988, there is disclosed a tire tread compound containing a styrene-butadiene copolymer rubber reinforced with a high structure carbon black designated as N103 and a particle size smaller than 20 nanometers. In addition, it is known from U.S. Pat. 4,474,908 that siliceous fillers having an ultimate particle size in the range of from 15 to 30 nanometers have been used in rubber. One advantage in using such nanomaterials in rubber is to improve the treadwear. Unfortunately, upon mixing nanomaterials in a rubber composition, such nanomaterials tend to reagglomerate and, therefore, increase the individual particle sizes which result in decreasing the benefits for which they are added. In addition, with increasing levels of nanomaterials in place of larger particles (>100 nanometers in diameter), the rubber becomes more hysteretic.

Precipitated spherical organosilicon particles having a core and a shell are disclosed in F. Bauman, et al., Adv. Materials, 1997, 9, No. 12, Pages 955 through 958. These particles are described as being soluble organosilicon micronetworks with spatially confined reaction sites.

SUMMARY OF THE INVENTION

The present invention relates to rubber compositions containing precipitated organosilicon particles having a core and shell.

DETAILED DESCRIPTION OF THE INVENTION

There is disclosed a rubber composition comprising:

(a) 100 parts by weight of at least one rubber containing olefinic unsaturation; and (b) 1 to 150 phr of precipitated organosilicon particles having a core and a shell, wherein the core is obtained by the condensation of at least one monomer of the formula:

$$R^1\text{—Si}(OR^2)_3 \qquad I$$

where $R^1$ is selected from the group consisting of hydrogen, methyl, ethyl, vinyl, alkoxy having from 1 to 4 carbon atoms, and phenyl; $R^2$ is selected from the group consisting of alkyls having from 1 to 4 carbon atoms and phenyl; and wherein said condensation of said monomer is in the presence of a surfactant; and wherein the shell is obtained by the subsequent addition to the core of a monomer of the formula $$R^3\text{—Si}(OR^2)_3 \qquad II$$

where $R^3$ is selected from the group consisting of

—CH=CH$_2$, —CH$_2$—CH=CH$_2$,

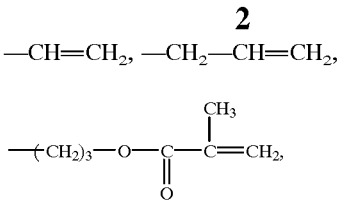

—(CH$_2$)$_n$—SH and mixtures thereof; and n is an integer of from 2 to 8.

The present invention may be used with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The precipitated organosilicon particles having a core and a shell are disclosed in F. Bauman et al., *Adv. Materials*, 1997, 9, No. 12, Pages 955 through 958, which is incorporated by reference herein in its entirety. These particles can be precipitated, dried and redispersed as single particles in conventional organic solvents and monomeric solvents such as tetrahydrofiran (THF), cyclohexane, chloroform, styrene and methylmethacrylate. As discussed later, the desired solubility is achieved by converting all reactive Si—OH moieties into "inert" Si—O—Si R groups.

The organosilicon particles are derived from a core. The particles may be spherical or other additional shapes depending upon the mixing conditions during preparation. Preferably, the particles are spherical. The core may be obtained from condensation of at least one monomer of the formula

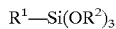
$$R^1\text{—Si}(OR^2)_3 \qquad \qquad \text{I}$$

where $R^1$ is selected from the group consisting of hydrogen, methyl, ethyl, vinyl, alkoxy having 1 to 4 carbon atoms and phenyl; and $R^2$ is selected from the group consisting of alkyls having from 1 to 4 carbon atoms and phenyl. Representative examples of monomers of formula I include methyltrimethoxysilane, phenyltrimethoxysilane, methyltriethoxysilane, tetraethoxysilane, tetramethoxysilane and vinyltrimethoxysilane. The core may also be prepared by the condensation of two monomers of formula I, say for example, where $R^1$ is hydrogen and $R^2$ is methyl.

The condensation reactions may be acid catalyzed or base catalyzed. Preferably, the reaction is base catalyzed. One example of a suitable base is sodium hydroxide.

The condensation reaction should be conducted in the presence of a surfactant. Suitable levels vary from fleet ratios of $0.06 < S < 0.4$ for the monomer of Formula I. Fleet ratio S is used herein as meaning the weight ratio of surfactant to the final polymer content assuming full conversion, i.e. $S \equiv [\text{surfactant}]/[R^1SiO_{3/2}]$.

Various conventional and well known surfactants may be present during the condensation reaction. Representative examples of types of surfactants including nonionic, cationic and amphoteric surfactants. Examples of nonionic surfactants include fatty acid glycerin and polyglycerine esters, sorbitan sucrose fatty acid esters, higher alcohol ethylene oxide adducts, polyoxyethylene alkyl and alkyl allyl ethers, polyoxyethylene lanolin alcohol, glycerin and polyoxyethylene glycerin fatty acid esters, polyoxyethylene propylene glycol and sorbitol fatty acid esters, polyoxyethylene lanolin, castor oil or hardened castor oil derivatives, polyoxyethylene fatty acid amides, polyoxyethylene alkyl amines, an alkylpyrolidone, glucamides, alkylpolyglucosides, mono- and dialkonol amides. Examples of cationic surfactants used herein include alkyltrimethylammonium salts, dialkyldimethylammonium salts, alkyldimethylbenzylammonium salts, alkylpyridium salts, alkylisoquinolinium salts, benzethonium salts, benzethonium chloride, and acylamino acid type cationic surfactants. Examples of the amphoteric surfactants include amino acid, betaine, sultaine, phosphobetaines, imidazoline type amphoteric surfactants, soybean phospholipid and yolk lecithin.

Once the core is formed, the shell may be obtained by the subsequent addition of a monomer of the formula

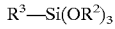
$$R^3\text{—Si}(OR^2)_3 \qquad \qquad \text{II}$$

where $R^3$ is selected from the group consisting of
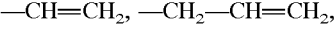
—CH=CH$_2$, —CH$_2$—CH=CH$_2$,

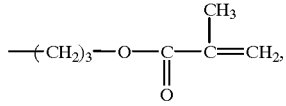
$$-(CH_2)_3-O-\underset{\underset{O}{\|}}{C}-\underset{CH_3}{\overset{CH_3}{|}}C=CH_2,$$

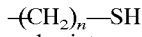
—(CH$_2$)$_n$—SH
and mixtures thereof; and n is an integer of from 2 to 8.

It has been reported that it may be beneficial to treat the reaction with trimethylmethoxysilane to avoid condensation of the Si—OH groups.

Upon completion of the above condensation reactions, the dispersions are destabilized with alcohol, i.e. methanol and the precipitates filtered, washed, and dried in a conventional manner.

The acid based-catalyzed dispersions of the particles are conducted in a manner similar to the base-catalyzed system. A fleet ratio of around 0.06 is appropriate.

The organosilicon particles generally range in size of from 5 nm to 60 nm. Preferably, such particles range from 5 to 20 nm.

The organosilicon particles may be characterized by the functional groups that are on the shell as a result of the use of the monomers of formula II. The amount of functionalization on a percent by weight basis may range of from 0.1 to 40 percent wgt/wgt, based on the overall weight of the particle. Preferably, the percent by weight ranges from 3 to 20 percent by weight.

The amount of the precipitated organosilicon particles that are present in the rubber may vary. For example, from 1 to 150 phr may be used. Preferably, from 20 to 80 is present in the rubber.

It is preferred to have the rubber composition additionally contain a conventional sulfur containing organosilicon compound. Examples of suitable sulfur containing organosilicon compounds are of the formula:

$$Z\text{-Alk-}S_n\text{-Alk-}Z \qquad (III)$$

in which Z is selected from the group consisting of

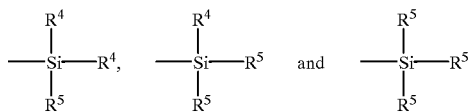

where $R^4$ is an alkyl group of 1 to 4 carbon atoms, cyclohexyl or phenyl; $R^5$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilyipropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore as to formula III, preferably Z is

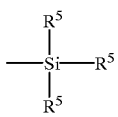

where $R^5$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of Formula III in a rubber composition will vary depending on the level of other additives that are used. Generally speaking, the amount of the compound of formula III will range from 0.5 to 20 phr. Preferably, the amount will range from 1 to 10 phr.

In addition to the precipitated spherical organosilicon particles having a core and shell, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 $cm^3/100$ g.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and precipitated organosilicon particles are mixed in one or more non-productive mix stages. The terms "non-productive" and "productive" mix stages are well known to those having skill in the rubber mixing art. The precipitated organosilicon particles may be added as a separate ingredient or in the form of a masterbatch. The rubber composition containing the precipitated organosilicon particles as well as the sulfur-containing organosilicon compound, if used, be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

One feature of the precipitated organosilicon particles having a core and a shell is their solubility in organic solvents. This feature offers the opportunity to incorporate such organosilicons into the elastomers via a number of ways aside from mechanical working in a mixer or extruder. For example, it is contemplated that one can disperse or dissolve the particles in a polymer cement (elastomer solubilized in an organic solvent) with mixing and removal of the solvent to yield a uniformly dispersed organosilicon in the elastomer. In accordance with another embodiment, one can solubilize the organosilicon particles in the organic solvent along with the monomer or monomers for subsequent solution polymerization. Under this embodiment, the monomers polymerize to form the elastomer in the organosilicon media.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in a sidewall and/or the tread of a tire. As can be appreciated, the tire may be a passenger tire, aircraft tire, truck tire and the like. Preferably, the tire is a passenger tire. The tire may also be a radial or bias, with a radial tire being preferred.

EXAMPLE

Duplicated below is the experimental preparations as reported by F. Bauman, et al, Adv. Materials, 1997, 9, No. 12, Pages 955 through 958. These preparations describe methods of providing the precipitated spherical organosilicon particles for use in the present invention.

All of the spherical particles were prepared by the base-catalyzed procedure. Different amounts of the surfactant benzethoniumchloride (Aldrich M=448 g/mol) were dissolved in 125 g water and 0.75 mmol NaOH (Fluka) was added. Under vigorous stirring (kpg 300 rpm), 25 g of monomer were added slowly within 45 minutes at room temperature. The clear, slightly opalescent dispersion was stirred continuously for 5 hours Stable dispersions were obtained for fleet ratios 0.06<S<0.4 for the monomer methyltrimethoxysilane (Wacker Chemie GmbH M=136 g/mol). Removal of the surfactant at this stage generally led to an insoluble precipitate because interparticle condensation took place. In order to avoid interparticle condensation, the Si—OH groups were first reacted with trimethylmethoxysilane (or a similar "endcapping" agent) before precipitation of the particles surface deactivation in the aqueous phase was achieved by addition of 1.2 g trimethylmethoxysilane (Wacker Chemie GmbH, M=104 g/mol) to 25 g of the dispersion with stirring, which was continued overnight at room temperature. The dispersion was destabilized by addition of 50 mL methanol and the precipitate was filtered and washed several times with methanol in order to remove the surfactant. This procedure enabled the particles to dissolve in organic solvents like THF or toluene. It turned out that, at this stage, the reaction of the SiOH moieties was not quantitative because sample drying led to insoluble products. For complete deactivation, the wet precipitate was dissolved in 50 mL toluene and 1.6 g hexamethyldisilazane (Wacker Chemie GmbH, M=161 g/mol) was added. The reaction mixture was stirred overnight at room temperature. The resulting product was precipitated with 180 mL methanol, filtered, pre-dried, and finally dried in vacuo overnight. A white powder was obtained.

The acid-catalyzed dispersion for the SiH containing $\mu$-networks was prepared in a similar manner to the base-catalyzed system. Here, a variable amount (typically 0.5 g) of dodecylbenzenesulfonic acid (Wacker Chemie GmbH) was dissolved in 125 mL deionized water (Milli-Q) and 25 g methyltrimethoxysilane was added at room temperature with stirring. The resulting fleet ratio S was of the order S=0.06. The deactivation of the SiOH groups was then performed as described above.

In the above recipes, the monomers used were methyltrimethoxysilane, phenyltrimethoxysilane, vinyltrimethoxysilane and triethoxysilane. Also, the "endcapping" reaction can be performed with the respective functionalized monomers in both the aqueous phase (X(CH$_3$)$_2$—Si—OCH$_3$) and in the organic phase with the monochloride (X(CH$_3$)$_2$—Si—Cl) or with the respective disilazane (X(CH$_3$)$_2$—Si—NH—Si—(CH$_3$)$_2$X).

The core shell structures were essentially prepared by the subsequent addition of two different monomers. The dispersion forming the core was stirred overnight before the second monomer was added and reacted until complete conversion. Except for the Si—H monomer, the functionalized shell monomer was added in 50 percent (w/w) mixture with methyltrimethoxysilane in order to achieve a high conversion and to avoid destabilization of the dispersion as discussed above.

While certain representative embodiments and details have been shown for the purpose of illustrating the invention, it will be apparent to those skilled in this art that various changes and modifications may be made therein without departing from the spirit or scope of the invention.

What is claimed is:

1. A method of processing a rubber composition containing a filler comprising mixing
   (a) 100 parts by weight of at least one rubber containing olefinic unsaturation; and
   (b) 1 to 150 phr of precipitated organosilicon particles having a core and shell,
   wherein the core is obtained by the condensation of at least one monomer of the formula:

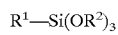  I where R$^1$ is selected from the group consisting of hydrogen, methyl, ethyl, vinyl, alkoxy having from 1 to 4 carbon atoms and phenyl; R$^2$ is selected from the group consisting of alkyls having from 1 to 4 carbon atoms and phenyl; and wherein said condensation of said monomer is in the presence of a surfactant; and
   wherein the shell is obtained by the subsequent addition to the core of a monomer of the formula:

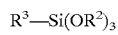  II where R$^3$ is selected from the group consisting of —CH=CH$_2$, —CH$_2$—CH=CH$_2$,

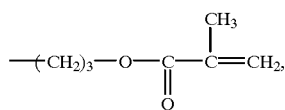

—(CH$_2$)$_n$SH and mixtures thereof; and n is an integer of from 2 to 8.

2. The method of claim 1 wherein from 0.5 to 20 phr of a sulfur containing organosilicon compound is present and is of the formula:

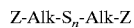  III in which Z is selected from the group consisting of

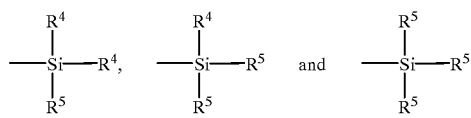

where R$^4$ is an alkyl group of 1 to 4 carbon atoms, cyclohexyl or phenyl; R$^5$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

3. The method of claim 2 wherein said rubber containing olefinic unsaturation is selected from the group consisting of natural rubber, neoprene, polyisoprene, butyl rubber, halobutyl rubber, polybutadiene, styrene-butadiene copolymer, styrene/isoprenebutadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

4. The method of claim 1 wherein the precipitated organosilicon particles and rubber containing olefinic unsaturation are mixed in the presence of an organic solvent.

5. The method of claim 1 wherein said rubber composition is thermomechanically mixed at a rubber temperature in a range of from 140° C. to 190° C. for a mixing time of from 1 to 20 minutes.

6. A rubber composition comprising
(a) 100 parts by weight of at least one rubber containing olefinic unsaturation; and
(b) 1 to 150 phr of precipitated organosilicon particles having a core and shell,
wherein the core is obtained by the condensation of at least one monomer of the formula:

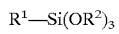  I where $R^1$ is selected from the group consisting of hydrogen, methyl, ethyl, vinyl, alkoxy having from 1 to 4 carbon atoms; $R^2$ is selected from the group consisting of alkyls having from 1 to 4 carbon atoms and phenyl; and wherein said condensation of said monomer is in the presence of surfactant; and
wherein the shell is obtained by the subsequent addition to the core of a monomer of the formula:

  II where $R^3$ is selected from the group consisting of
—CH=CH$_2$, —CH$_2$—CH=CH$_2$,

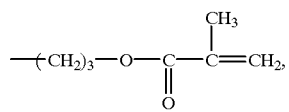

—(CH$_2$)$_n$—SH and mixtures thereof; and n is an integer of from 2 to 8.

7. The rubber composition of claim 6 wherein $R^1$ is hydrogen.

8. The rubber composition of claim 6 wherein $R^1$ is methyl.

9. The rubber composition of claim 6 wherein the core is obtained by the condensation of two monomers of the formula

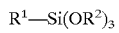  I where $R^1$ for one monomer is hydrogen and $R^1$ for the second monomer is methyl.

10. The rubber composition of claim 6 wherein the organosilicon particles range in size form 5 nm to 20 nm.

11. The rubber composition of claim 6 wherein said surfactant is selected from the group consisting of nonionic, cationic and amphoteric surfactants.

12. The rubber composition of claim 7 wherein following the addition of the monomers of formula II, the surfaces of the core is treated with a chemical of the formula

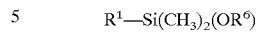  IV wherein $R^6$ is selected from the group consisting of methyl and ethyl.

13. The rubber composition of claim 6 wherein the monomer of formula II was present in a mixture with chemical of formula I.

14. The composition of claim 6 wherein said rubber is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

15. The composition of claim 6 wherein from 0.5 to 20 phr of a sulfur containing organosilicon compound is present and is of the formula:

  III in which Z is selected from the group consisting of

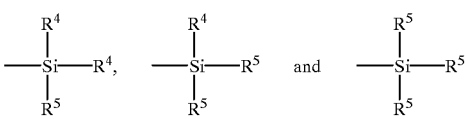

where $R^4$ is an alkyl group of 1 to 4 carbon atoms, cyclohexyl or phenyl; $R^5$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

16. The composition of claim 6 wherein the precipitated organosilane particles and rubber containing olefinic unsaturation are mixed in the presence of an organic solvent.

17. The composition of claim 6 wherein said composition is thermomechanically mixed at a rubber temperature in a range of from 140° C. to 190° C. for a total mixing time of from 1 to 20 minutes.

18. A sulfur vulcanized rubber composition which is prepared by heating the composition of claim 6 to a temperature ranging from 100° C. to 200° C. in the presence of a sulfur vulcanizing agent.

19. The rubber composition of claim 18 in the form of a tire, belt or hose.

20. A tire having a tread comprised of the composition of claim 18.

* * * * *